(12) United States Patent
Huang

(10) Patent No.: US 8,897,429 B2
(45) Date of Patent: Nov. 25, 2014

(54) COMMUNICATION CIRCUIT EMPLOYING OPTOCOUPLER

(71) Applicants: Fu Tai Hua Industry (Shenzhen) Co., Ltd., Shenzhen (CN); Hon Hai Precision Industry Co., Ltd., New Taipei (TW)

(72) Inventor: Ren-Wen Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/853,145

(22) Filed: Mar. 29, 2013

(65) Prior Publication Data

US 2013/0266134 A1 Oct. 10, 2013

(30) Foreign Application Priority Data

Apr. 5, 2012 (CN) .......................... 2012 1 0096803

(51) Int. Cl.
*H04M 11/00* (2006.01)
*H04M 9/08* (2006.01)
*H04M 1/74* (2006.01)

(52) U.S. Cl.
CPC ...................................... *H04M 1/74* (2013.01)

USPC .................................. 379/93.05; 379/406.01

(58) Field of Classification Search
None
See application file for complete search history.

(56) References Cited

U.S. PATENT DOCUMENTS

| | | | |
|---|---|---|---|
| 5,859,557 A * | 1/1999 | Schley-May | 327/333 |
| 5,875,235 A * | 2/1999 | Mohajeri | 379/93.36 |
| 7,715,550 B2 * | 5/2010 | Pildner | 379/402 |
| 2005/0094802 A1* | 5/2005 | Ahmed | 379/399.01 |

* cited by examiner

*Primary Examiner* — Fan Tsang
*Assistant Examiner* — Jeffrey Lytle
(74) *Attorney, Agent, or Firm* — Novak Druce Connolly Bove + Quigg LLP

(57) ABSTRACT

An communication circuit of a communication device includes an interface unit, a direct current (DC) control circuit, a voice output circuit includes a voice input terminal, and a voice receiving circuit includes a voice output terminal. The interface unit outputs human speech and receives human speech from another communication device. The DC control circuit provides a constant current for the optocoupler circuit. When the outgoing human speech is coupled to the DC control circuit by a first optocoupler and sent to another communication device and incoming human speech is transmitted from the other communication device via the DC control circuit and a second optocoupler, echoes and extraneous noise in the speech is reduced.

19 Claims, 2 Drawing Sheets

COMMUNICATION CIRCUIT EMPLOYING OPTOCOUPLER

BACKGROUND

1. Technical Field

The present disclosure relates to a communication circuit employing an optocoupler to ensure an electrical isolation function.

2. Description of Related Art

A communication device generally includes a transformer as an electrical isolation element. However, a coil of the transformer may generate noise, and an inherently large size of the transformer prevents devices from being made smaller.

Therefore, what is needed a means to overcome the above described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
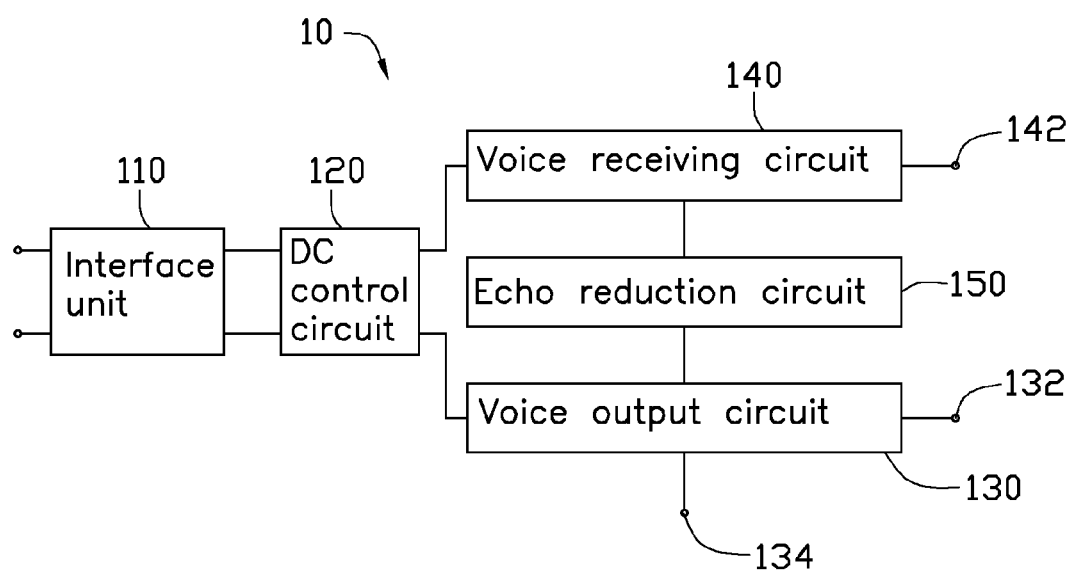
FIG. 1 is a circuit block diagram of a communication circuit of the communication device according to an exemplary embodiment of the present disclosure.
Figure 2:
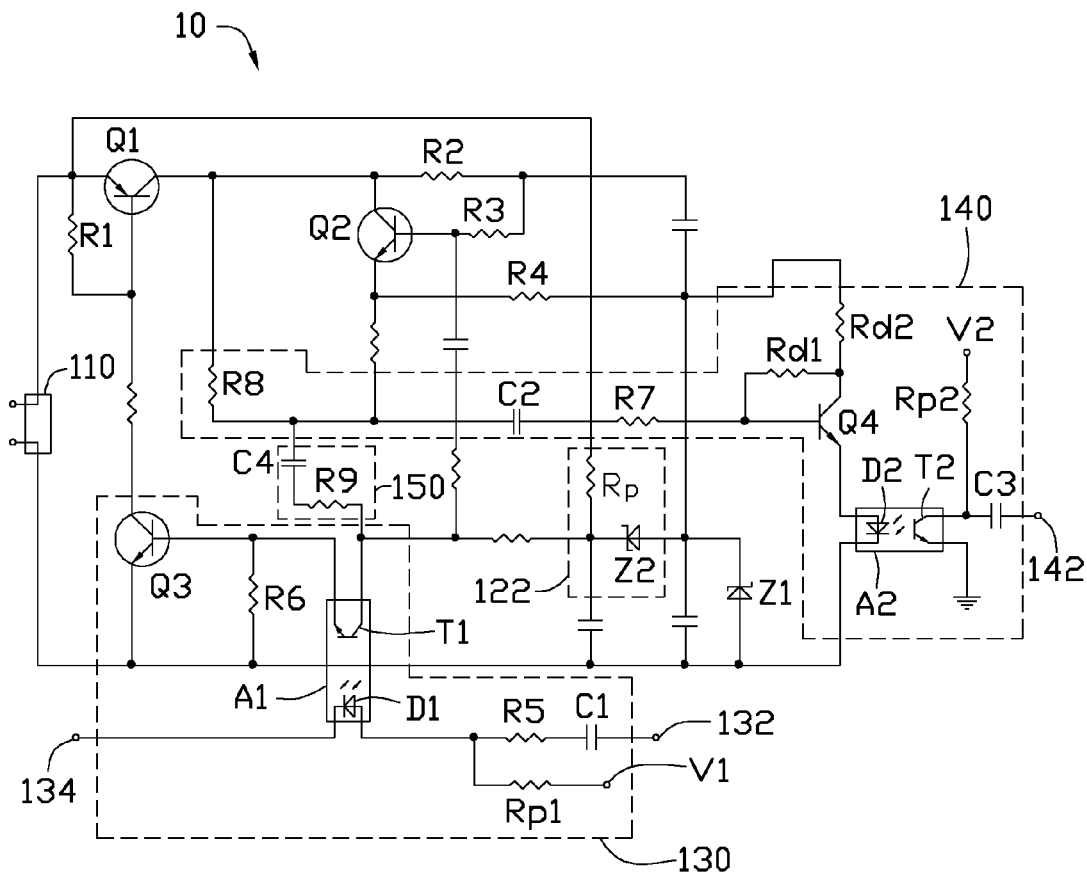
FIG. 2 is a detailed circuit diagram of the communication device of FIG. 1.

FIG. 1 is a circuit block diagram of a communication circuit 10 of the communication device according to an exemplary embodiment of the present disclosure. The communication circuit 10 is employed in a communication device, such as a telephone. The communication device is capable of communicating with other communication devices via a switch so as to output, transmit, and receive the sound of a human voice (hereinafter outputting a first voice signal and receiving a second voice signal). The first voice signal and the second voice signal are capable of being output and received synchronously or asynchronously. The communication circuit 10 includes an interface unit 110, a direct current (DC) control circuit 120, a voice output circuit 130, and a voice receiving circuit 140. The interface unit 110 connects to the DC control circuit 120. The DC control circuit 120 connects to the voice output circuit 130 and the voice receiving circuit 140. The voice output circuit 130 includes a voice input terminal 132 and a control signal input terminal 134. The voice receiving circuit 140 includes a voice output terminal 142. The interface unit 110 outputs the first voice signal and receives the second voice signal. The first voice signal into the voice input terminal 132 is coupled to the DC control circuit 120 by the function of a first optocoupler Al (as shown in FIG. 2) of the voice output circuit 130 and is then output to other communication devices via the interface unit 110. The second voice signal is transmitted from the other communication device via the interface unit 110 and is coupled from the DC control circuit to the voice output terminal 142 by the function of a second optocoupler A2 of the voice receiving circuit 140.

The control signal input terminal 134 receives a control signal which is configured to activate and control the DC control circuit 120. When the DC control circuit 120 is in an activated state, the DC control circuit 120 provides a constant current for the communication circuit 10.

The communication circuit 10 further includes an echo reduction circuit 150 coupled between the voice output unit 130 and the voice receiving circuit 140. The echo reduction circuit 150 reduces echoes of the first voice signal and the second voice signal.

In one embodiment, the communication circuit 10 is arranged in the telephone, the telephone includes an earphone (not shown), when the earphone is taken from a base of the telephone, the control signal input terminal 134 receives the control signal and the DC control circuit 120 is activated. The interface unit 110 can be for example an RJ11 interface.

FIG. 2 shows an exemplary circuit diagram of the communication circuit 10. The DC control circuit 120 is provided with an electrical current from the switch via the interface unit 110. The DC control circuit 120 includes a first transistor Q1, a second transistor Q2, a first zener diode Z1, and a plurality of resistors, such as resistors R1-R4.

Both the first transistor Q1 and second transistor Q2 include a first conducting terminal, a second conducting terminal, and a control terminal The first conducting terminal of the first transistor Q1 is connected to the interface unit 110, and is further connected to the control terminal of the first transistor Q1 via a first resistor R1. The control terminal of the first transistor Q1 is also connected to the voice output circuit 130. The second conducting terminal of the second transistor Q2 is connected to the second conducting terminal of the first transistor Q1. The second conducting terminal of the second transistor Q2 is connected to the control terminal of the second transistor Q2 via a second resistor R2 and a third resistor R3.

A cathode of the zener diode Z1 is electrically connected to a node between the second and third resistors R2, R3 via a capacitor (not labeled), and is also connected to the first conducting terminal of the second transistor Q2 via a fourth resistor R4. An anode of the zener diode Z1 is electrically connected to the interface unit 110. The zener diode Z1 is also connected another capacitor (not labeled) in parallel.

In the embodiment, the first transistor Q1 can be a pnp-type bipolar junction transistor (pnp BJT). The control terminal of the first transistor Q1 is a base electrode of the pnp BJT, the first conducting terminal of the first transistor Q1 is an emitter electrode of the pnp BJT, and the second conducting terminal of the first transistor Q1 is a collector electrode of the pnp BJT. The second transistor Q2 can be an npn-type bipolar junction transistor (npn BJT). The control terminal of the second transistor Q2 is a base electrode of the npn BJT, the first conducting terminal of the second transistor Q2 is an emitter electrode of the npn BJT, the second conducting terminal of the second transistor Q2 is a collector electrode of the npn BJT.

The voice output circuit 130 includes a first optocoupler A1, a fifth resistor R5, a sixth resistor R6, a first pull-up resistor Rp1, a first capacitor C1 and a third transistor Q3. The first optocoupler A1 includes a first photosensitive diode D1 and a first phototransistor T1. An anode of the first photosensitive diode D1 is electrically connected to a first voltage V1 via the first pull-up resistor Rp1, and is also connected to the voice input terminal 132 via the fifth resistor R5 and first capacitor C1 in series. A cathode of the first photosensitive diode D1 is electrically connected to the control signal input terminal 134. A collector electrode of the first phototransistor T1 is connected to the cathode of the second zener diode Z2, and is also connected to the control terminal of the second transistor Q2 via a filter circuit formed by a resistor and a capacitor connected in series.

The third transistor Q3 includes a first conducting terminal, a second conducting terminal, and a control terminal. The control terminal of the third transistor Q3 is electrically connected an emitter electrode of the first phototransistor T1. The second conducting terminal of the third transistor Q3 is electrically connected to the control terminal of the transistor Q1 via a resistor (not labeled). The first conducting terminal of the third transistor Q3 is connected to the interface unit 110 and connected to the control terminal of the third transistor Q3 via the sixth resistor R6. In the embodiment, the third transistor Q3 can be an npn-type bipolar junction transistor (npn BJT). The control terminal of the third transistor Q3 is a base electrode of the npn BJT, the first conducting terminal of the third transistor Q3 is an emitter electrode of the npn BJT, and the second conducting terminal of the third transistor Q3 is a collector electrode of the npn BJT.

The voice receiving circuit 140 includes a fourth transistor Q4, a second optocoupler A2, a second capacitor C2, a third capacitor C3, a seventh resistor R7, a eighth resistor R8, a first bias resistor Rd1, a second bias resistor Rd2, and a second pull-up resistor Rp2. The fourth transistor Q4 includes a control terminal, a first conducting terminal, and a second conducting terminal. The control terminal of the fourth transistor Q4 is electrically connected to the second terminal of the first transistor Q1 via the seventh resistor R7, a second capacitor C2, and the eighth resistor R8, in series. The second conducting terminal of the fourth transistor Q4 is connected to the control terminal of the fourth transistor Q4 via the first bias resistor Rd1. The second conducting terminal of the fourth transistor Q4 is also connected to the cathode of the first zener diode Z1 via the second bias resistor Rd2. The second optocoupler A2 includes a second photosensitive diode D2 and a second phototransistor T2. The second photosensitive diode D2 is connected to the first conducting terminal of the fourth transistor Q4 and the anode of the first zener diode Z1. A collector electrode of the second phototransistor T2 is electrically connected to a second voltage V2 and the voice output terminal 142 via the third capacitor C3. An emitter electrode of the second photo transistor T2 is grounded.

The fourth transistor Q4 may be an npn-type bipolar junction transistor (npn BJT). The control terminal of the fourth transistor Q4 is a base electrode of the npn BJT, the first conducting terminal of the fourth transistor Q4 is an emitter electrode of the npn BJT, the second conducting terminal of the fourth transistor Q4 is a collector electrode of the npn BJT.

The echo reduction circuit 150 includes a fourth capacitor C4, a ninth resistor R9. One end of the ninth resistor R9 is electrically connected to the collector electrode of the first phototransistor T1, and other end of the ninth resistor R9 is electrically connected to a node between the eighth resistor R8 and the second capacitor C2 via the fourth capacitor C4.

The DC control circuit 120 further includes a pull-up circuit 122 for providing a coupling voltage for the first photo transistor T1. The pull-up circuit 122 includes a pull-up resistor Rp and a second zener diode Z2. The pull-up resistor Rp and the second zener diode Z2 are connected in series between the interface unit 110 and the cathode of the first zener diode Z1. An anode of the second zener diode Z2 is electrically connected to the collector electrode of the first phototransistor T1 via a resistor (not labeled). A node between the pull-up resistor Rp and the second zener diode Z2 is electrically coupled to the interface unit 110 via a capacitor (not labeled).

In operation, when the earphone is being used, the control signal input terminal 134 receives the control signal, and at the same time, the first voltage V1 is applied to the first photosensitive diode D1, thus the first photosensitive diode D1 is activated. Accordingly, a current flows through the first phototransistor T1. The control signal can be for example a logic low signal (e.g., logic 0) or a ground signal. The pull-up resistor Rp, the first zener diode Z1, and the second zener diode Z2 provide a pull-up voltage to the collector electrode of the first phototransistor T1, and the third transistor Q3 is activated, thus the first transistor Q1 and the second transistor Q2 are both activated. The first transistor Q1, the second transistor Q2, and the first zener diode Z1 form a loop circuit to provide a constant current for the communication circuit 10.

The voice input terminal 132 receives the first voice signal; the first voice signal is transmitted to the first photosensitive diode D1 via the first capacitor C1 and the fifth resistor R5. Then the first voice signal is coupled to the control terminal of the third transistor Q3 via the first phototransistor T1. The third transistor Q3 amplifies and transmits the first voice signal to the first transistor Q1 and the interface unit 110. The interface unit 110 outputs the first voice signal.

The second voice signal is transmitted into the voice receiving circuit 140 via the interface unit 110 and the first transistor Q1. In detail, the second voice signal is transmitted to the fourth transistor Q4 via the eighth resistor R8, the second capacitor C2, and the seventh resistor R7. The fourth transistor Q4 amplifies the second voice signal with the first bias resistor Rd1 and the second bias resistor Rd2. The second voice signal amplified by the fourth transistor Q4 is transmitted to the second photosensitive diode D2, and then the second voice signal is coupled to the second phototransistor T2. Thus the second voice signal is output by the voice output terminal 142 via the third capacitor C3.

The echo reduction circuit 150 attenuates or altogether reduces any echo between the voice output circuit 130 and the voice receiving circuit 140. The values of the ninth resistor R9 and of the fourth capacitor C4 can be adjusted to attenuate echoes.

In summary, the optocoupler does not include the coil so as to couple the voice signal reducing noise. Furthermore, the communication circuit 10 includes an echo reduction circuit to attenuate echoes between the voice output circuit and the voice receiving circuit.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. A communication circuit of a first communication device, comprising:
   an interface unit;
   the interface unit outputting a first voice signal to a second communication device and receiving a second voice signal from the second communication device;
   a DC control circuit providing a constant current for the communication circuit;
   the DC control circuit connecting to a voice output circuit comprising a voice input terminal and a control signal input terminal and a voice receiving circuit comprising a voice output terminal; and
   wherein in DC control circuit comprises a first transistor, a second transistor, a first zener diode and a plurality of resistors; the first transistor and the second transistor both comprises a first conducting terminal, a second conducting terminal and a control terminal; the first conducting terminal of the first transistor is electrically connected to the interface, the first conducting terminal of the first transistor is electrically connected to the control terminal of the first transistor via a first resistor, the control terminal of the first transistor is electrically connected to the voice output circuit, the second conducting terminal of the first transistor is electrically connected to the second conducting terminal of the second transistor, the second conducting terminal of the second transistor is electrically connected to the control terminal of the second transistor via a second resistor and a third resistor in series; a cathode of the first zener diode is electrically connected to the first conducting terminal of the second transistor, an anode of the first zener diode is electrically connected to the interface unit;

wherein the first voice signal into the voice input terminal is coupled to the DC control circuit by a first optocoupler and the interface unit outputs the first voice signal to the second communication device; and the second voice signal is transmitted from the second communication device via the interface unit and is coupled from the DC control circuit to the voice output terminal by a second optocoupler.

2. The communication circuit of claim 1, wherein the voice output circuit further comprises a control signal input terminal, and when the control signal input terminal receives a control signal, the DC control circuit is activated.

3. The communication circuit of claim 1, wherein the first transistor is a pnp-type bipolar junction transistor (pnp BJT), the control terminal of the first transistor is a base electrode of the pnp BJT, the first conducting terminal of the first transistor is an emitter electrode of the pnp BJT, and the second conducting terminal of the first transistor is a collector electrode of the pnp BJT; the second transistor is a npn-type bipolar junction transistor (npn BJT), the control terminal of the second transistor is a base electrode of the npn BJT, the first conducting terminal of the second transistor is an emitter electrode of the npn BJT, and the second conducting terminal of the second transistor is a collector electrode of the npn BJT.

4. The communication circuit of claim 1, wherein the voice output circuit comprises a third transistor to amplify the first voice signal.

5. The communication circuit of claim 4, wherein the voice receiving circuit comprises a fourth transistor to amplify the second voice signal.

6. The communication circuit of claim 5, wherein the DC control circuit further comprises a pull-up circuit coupled between the interface unit and the first zener diode to provide a coupling voltage for a first phototransistor of the voice output circuit.

7. The communication circuit of claim 6, wherein the pull-up circuit comprises a pull-up resistor and a second zener diode electrically coupled between the interface unit and a cathode of the second zener diode, a cathode of the second zener diode is electrically coupled to a collector electrode of the first phototransistor.

8. The communication circuit of claim 7, wherein the communication circuit further comprises an echo reduction circuit coupled between the voice output circuit and the voice receiving circuit, to eliminate echoes between the first voice signal and the second voice signal.

9. The communication circuit of claim 8, wherein the echo reduction circuit comprises a first capacitor and a fourth resistor electrically coupled between a phototransistor of the first optocoupler and the second conducting terminal of the first transistor.

10. A communication circuit, comprising:
an interface unit;
a direct current (DC) control circuit connecting to the interface unit and providing a constant current to the communication circuit, wherein the DC control circuit comprises a first transistor, a second transistor, a first zener diode and a plurality of resistors; the first transistor and the second transistor both comprises a first conducting terminal, a second conducting terminal and a control terminal; the first conducting terminal of the first transistor is electrically connected to the interface, the first conducting terminal of the first transistor is electrically connected to the control terminal of the first transistor via a first resistor, the control terminal of the first transistor is electrically connected to the voice output circuit, the second conducting terminal of the first transistor is electrically connected to the second conducting transistor is electrically connected to the control terminal of the second transistor via a second resistor and a third resistor in series; a cathode of the first zener diode is electrically connected to the first conducting terminal of the second transistor, an anode of the first zener diode is electrically connected to the interface unit;
a voice output circuit and a voice receiving circuit both electrically connected to the DC current control circuit;
the voice output circuit comprising a voice input terminal receiving an outgoing voice signal and coupling the outgoing human voice signal to the interface unit by a first optocoupler;
the voice receiving circuit receiving an incoming voice signal from the interface unit and coupling the incoming voice signal to a voice output terminal of the voice receiving circuit by a second optocoupler.

11. The communication circuit of claim 10, wherein the voice output circuit further comprises a control signal input terminal, and when the control signal input terminal receives a control signal, the DC control circuit is activated.

12. The communication circuit of claim 10, wherein the first transistor is a pnp-type bipolar junction transistor (pnp BJT), the control terminal of the first transistor is a base electrode of the pnp BJT, the first conducting terminal of the first transistor is an emitter electrode of the pnp BJT, and the second conducting terminal of the first transistor is a collector electrode of the pnp BJT; the second transistor is a npn-type bipolar junction transistor (npn BJT), the control terminal of the second transistor is a base electrode of the npn BJT, the first conducting terminal of the second transistor is an emitter electrode of the npn BJT, and the second conducting terminal of the second transistor is a collector electrode of the npn BJT.

13. The communication circuit of claim 10, wherein the voice output circuit comprises the first optocoupler, and a third transistor; the first optocoupler is configured to couple the first voice signal to the interface unit, and the third transistor configures amplifies the first voice signal.

14. The communication circuit of claim 13, wherein the voice receiving circuit comprises a fourth transistor and the second optocoupler; the fourth transistor configures to amplify the second voice signal, and then the second optocoupler configures to couple the second voice signal to the voice output terminal.

15. The communication circuit of claim 14, wherein the DC control circuit further comprises a pull-up circuit coupled between the interface unit and the first zener diode to provide a coupling voltage for a first phototransistor of the voice output circuit.

16. The communication circuit of claim 15, wherein the pull-up circuit comprises a pull-up resistor and a second zener diode electrically coupled between the interface unit and a cathode of the second zener diode, a cathode of the second zener diode is electrically coupled to a collector electrode of the first phototransistor.

17. The communication circuit of claim 16, wherein the communication circuit further comprises an echo reduction circuit coupled between the voice output circuit and the voice receiving circuit, to eliminate an echo between the first voice signal and the second voice signal.

18. The communication circuit of claim 17, wherein the echo reduction circuit comprises a first capacitor and a fourth resistor electrically coupled between a phototransistor of the first optocoupler and the second conducting terminal of the first transistor.

19. A communication circuit, comprising:
    an interface unit;
    a direct current (DC) control circuit connecting to the interface unit and providing a constant current to the communication circuit, wherein the DC control circuit comprises a first transistor, a second transistor, a first zener diode and a plurality of resistors; the first transistor and the second transistor both comprises a first conducting terminal, a second conducting terminal and a control terminal; the first conducting terminal of the first transistor is electrically connected to the interface, the first conducting terminal of the first transistor is electrically connected to the control terminal of the first transistor via a first resistor, the control terminal of the first transistor is electrically connected to the voice output circuit, the second conducting terminal of the first transistor is electrically connected to the second conducting terminal of the second transistor, the second conducting terminal of the second transistor is electrically connected to the control terminal of the second transistor via a second resistor and a third resistor in series; a cathode of the first zener diode is electrically connected to the first conducting terminal of the second transistor, an anode of the first zener diode is electrically connected to the interface unit;
    a voice output circuit and a voice receiving circuit both electrically connected to the DC current control circuit;
    the voice output circuit comprising a voice input terminal receiving an outgoing voice signal and coupling the outgoing human voice signal to the interface unit by a first optocoupler;
    the voice receiving circuit receiving an incoming voice signal from the interface unit and coupling the incoming voice signal to a voice output terminal of the voice receiving circuit by a second optocoupler; and
    an echo reduction circuit coupled between the voice output circuit and the voice receiving circuit, the echo reduction circuit eliminating an echo between the first voice signal and the second voice signal.

* * * * *